United States Patent
Ratzi et al.

(10) Patent No.: US 6,675,763 B1
(45) Date of Patent: Jan. 13, 2004

(54) LIGHT METAL MOLDED PART, ESPECIALLY A CRANKCASE FOR AN INTERNAL COMBUSTION ENGINE

(75) Inventors: Raimund Ratzi, Wels (AT); Karl-Heinz Menzl, München (DE)

(73) Assignees: Miba Sintermetall Aktiengesellschaft, Laakirchen (AT); KS Aluminium-Technology AG, Neckarsulm (DE)

( * ) Notice: Subject to any disclaimer, the term of this patent is extended or adjusted under 35 U.S.C. 154(b) by 0 days.

(21) Appl. No.: 10/069,865

(22) PCT Filed: Feb. 23, 2000

(86) PCT No.: PCT/AT00/00047
§ 371 (c)(1),
(2), (4) Date: Feb. 26, 2002

(87) PCT Pub. No.: WO00/57047
PCT Pub. Date: Sep. 28, 2000

(30) Foreign Application Priority Data

Mar. 19, 1999 (AT) .................................................. 497/99

(51) Int. Cl.⁷ .................................................. F02F 7/00
(52) U.S. Cl. .................................................. 123/195 R
(58) Field of Search .................................................. 123/195 R

(56) References Cited

U.S. PATENT DOCUMENTS

| | | | |
|---|---|---|---|
| 4,905,642 A | * 3/1990 | Suzuki et al. | 123/195 R |
| 5,203,854 A | * 4/1993 | Nilsson et al. | 123/195 R |
| 5,449,421 A | 9/1995 | Hamajima et al. | |
| 5,463,991 A | * 11/1995 | Krotky et al. | 123/195 R |
| 5,564,837 A | * 10/1996 | Putnam et al. | 123/195 R |
| 5,651,340 A | * 7/1997 | Schwaderlapp et al. | 123/195 R |
| 5,816,710 A | 10/1998 | Warwick et al. | |
| 6,192,852 B1 | * 2/2001 | Gerhards et al. | 123/195 R |
| 6,231,240 B1 | * 5/2001 | Brenker et al. | 123/195 R |

FOREIGN PATENT DOCUMENTS

| | | |
|---|---|---|
| DE | 195 32 326 | 9/1995 |
| EP | 0 168 851 | 5/1985 |
| EP | 0 145 393 | 6/1985 |
| EP | 0 363 159 | 4/1990 |
| GB | 2 237 337 | 5/1991 |
| WO | 95 31637 | 11/1995 |

* cited by examiner

Primary Examiner—Henry C. Yuen
Assistant Examiner—Jason Benton
(74) Attorney, Agent, or Firm—Collard & Roe, P.C.

(57) ABSTRACT

Described is a molded part made of light metal, in particular a crankcase for an internal combustion engine, comprising holes (5) for receiving fastening screws (6) with the help of which compressive strains can be exerted on the molded body in a light metal area. In order to create advantageous constructional conditions, it is proposed that at least one open-pored sintered body (7) is cast in the light metal area exposed to compressive strains with infiltration of the light metal at least in the pores of a surface layer; and that the sintered body (7) having a lower coefficient of thermal expansion than the light metal has a strength at least corresponding with the strength of the light area when combined with the infiltrated light metal.

4 Claims, 2 Drawing Sheets

Figure 1:
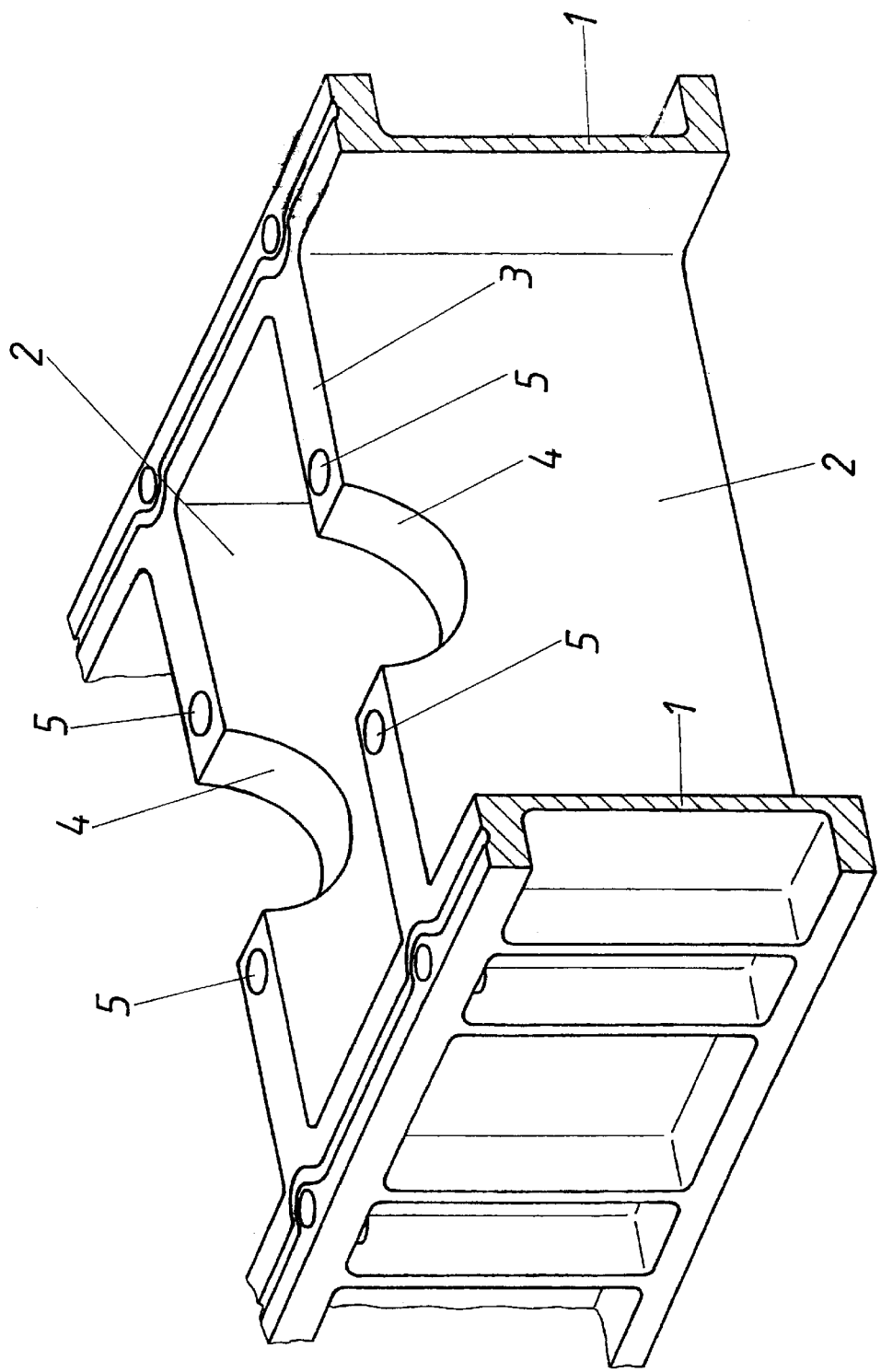

LIGHT METAL MOLDED PART, ESPECIALLY A CRANKCASE FOR AN INTERNAL COMBUSTION ENGINE

CROSS REFERENCE TO RELATED APPLICATIONS

Applicants claim priority under 35 U.S.C. §119 of Austrian Application No. A 497/99 filed Mar. 19, 1999. Applicants also claim priority under 35 U.S.C. §365 of PCT/AT00/00047 filed Feb. 23, 2000. The international application under PCT article 21 (2) was not published in English.

The invention relates to a molded part made of light metal, in particular to a crankcase for an internal combustion engine, comprising holes for receiving fastening screws with the help of which compressive strains can be exerted on the molded body in a light metal area.

As molded parts made of light metal exhibit a different thermal expansion behavior as compared to the steel-made fastening screws usually employed, the stress conditions change with the change in temperature because of compressive forces exerted on molded light metal bodies with the help of fastening screws made of steel. This may become noticeable, for example in the form of a substantial reduction of the clamping forces. So as to avoid in connection with bearing blocks of light-metal crankcases any excessive increase in the play of the bearing at higher operating temperatures, it is known (from U.S. Pat. No. 5,203,854 A) to support the crankshaft bearings with the bearing screws in gray cast inserts, which are cast into the walls of the bearing. This means that the expansion behavior is determined by the gray cast inserts, which form a substantial part of the bearing walls, and not by the adjoining light metal areas of the bearing walls, so that largely uniform conditions of thermal expansion can be expected in the zone of the crankshaft bearings and their screw connections. This has an advantageous effect on the play of the bearing or the strength of the screw joint. However, it is a drawback in connection with such known crankcases, among other things, that the weight advantage of the light metal walls is cancelled to a substantial degree because of the gray cast insert receiving the screw forces and the geometric dimensions connected therewith.

Therefore, the invention is based on the problem of realizing a molded part made of light metal, in particular a crankcase for an internal combustion engine of the type specified above, in such a manner that it is possible to create advantageous fastening conditions in spite of the different thermal expansion behavior of the light metal and the fastening screws, notably by largely exploiting the weight advantages offered by the light metal.

The problem is solved by the invention in that at least one open-pored sintered body is cast in the light metal area exposed to compressive strains into the pores of a surface layer, with infiltration of the light metal, and in that the sintered body having a lower coefficient of thermal expansion than the light metal, has a strength corresponding at least with the strength of the light metal at least after it has been combined with the infiltrated light metal.

A sintered body with a coefficient of thermal expansion that is lower than the one of the light metal is capable of altering the thermal expansion behavior of the light metal if the sintered body is joined with the light metal in a manner proof to shear, and that the composite has a strength at least corresponding with the strength of the light metal, so that the light metal is prevented from freely expanding under heat in the area of the sintered body. The shear-proof joint between the light metal and the sintered body is obtained if the light metal melt, as it is being cast preferably by a pressure casting method, infiltrates at least the pores of a surface layer of the sintered body. This permits adequately high shearing strains to build up in the finished molded part in the area of transition from the light metal to the sintered body in order to suppress any relative movement between the sintered body and the light metal. The sintered bodies, which can be employed in accordance with the given stress requirements that the molded part has to meet, can be provided in this connection with comparatively small dimensions, so that the increase in weight connected with such sintered bodies remains limited all the more so because the porosity required for the sintered bodies results in a weight reduction as compared to non-sintered inserts. Since the strength of the sintered body increases with infiltration of the light metal, the sintered body without infiltrated light metal may have a lower strength than the light metal but will nonetheless satisfy the strength requirements with respect to limitation of free expandability of the light metal if the sintered body infiltrated with light metal has the strength required for such limitation.

Particularly advantageous construction conditions can be obtained if the sintered body has a coefficient of thermal expansion adapted to the fastening screws, so that comparable conditions are obtained with respect to the strength of the screwed joint when steel parts are screwed together.

Since a shear-proof joint between the sintered body and the light metal is primarily involved in the present case by infiltrating the light metal into the pores of the sintered body, the core area of the sintered body may have a higher density than the one found in the surface area. This facilitates the infiltration of the light metal into the pores of the surface layer, on the one hand, and leads to a higher strength of the sintered bodies on the other. However, the strength of the cast, sintered bodies can be improved by reinforcements as well. Of course, such reinforcements may not permanently impair the capability of the sintered body of being infiltrated when the light metal is poured around the sintered body.

Figure 2:
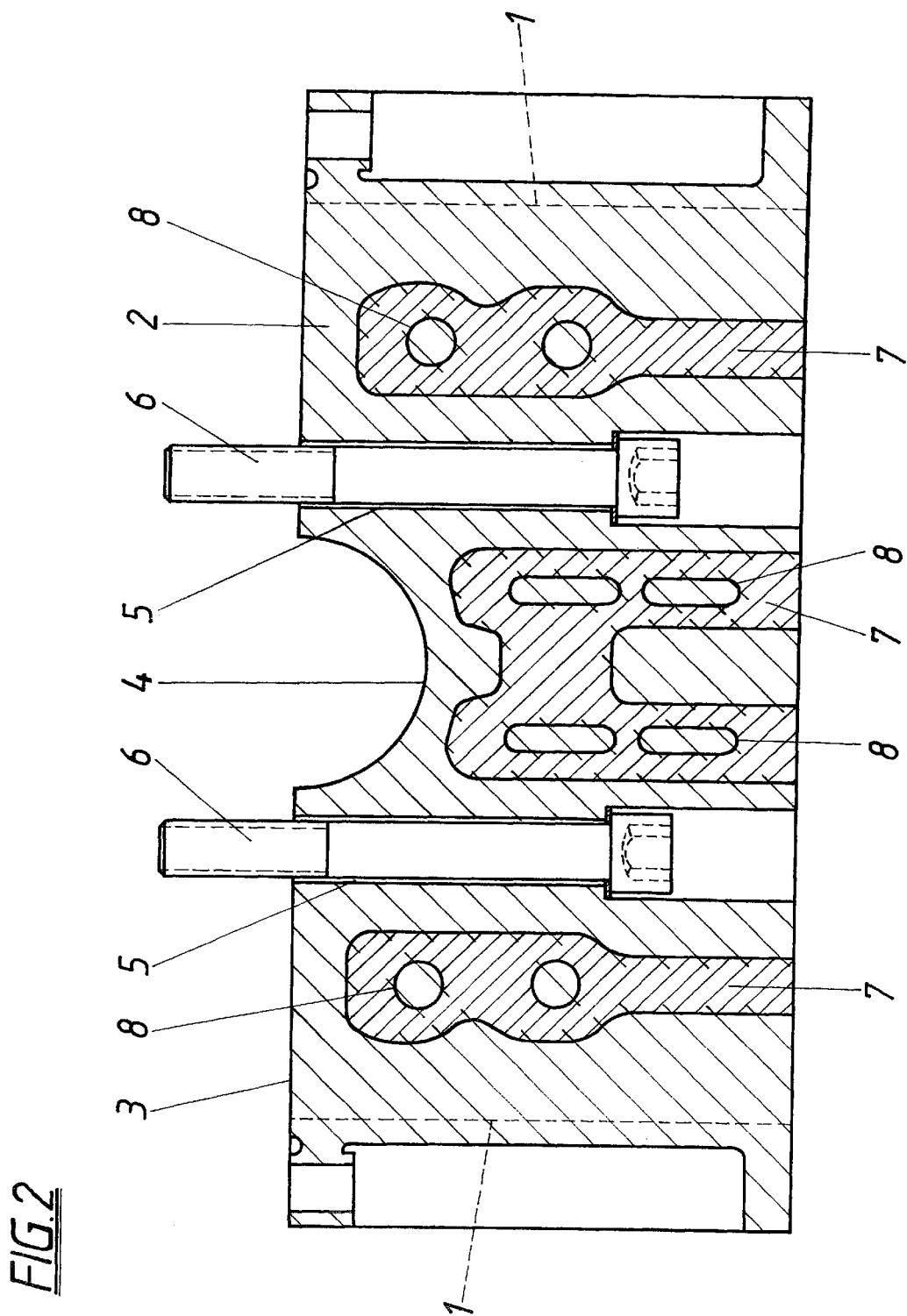

The object of the invention is shown by way of example in the drawing, in which:

FIG. 1 shows the lower part of a crankcase as defined by the invention by a cutout in a simplified diagram; and FIG. 2 shows said lower part of the crankcase by a cross section through a wall of the bearing.

The shown lower part of the light-metal crankcase as defined by the invention comprises in the conventional manner the outer crankcase walls 1 extending lengthwise, and the bearing walls 2 aligned transversely to said longitudinal walls and connecting said outer crankcase walls 1. Starting from the area of separation 3 versus the upper part of the crankcase, said bearing walls form the receptacles 4 for receiving the bearing cups of the crankshaft bearings, said receptacles having a semi-circular cross section. Provision is made on both sides of said receptacles 4 for the receiving holes 5 drilled in the bearing walls 2 for receiving the fastening screws 6, via which the bearing forces are discharged into the bearing walls 2. Within the area of the receiving holes 5, the sintered bodies 7, which have an adequate porosity, are cast into the light metal of the bearing walls 2 in order to permit infiltration of the light metal into the pores of at least one surface layer. Such infiltration of the sintered bodies 7 by the light metal is indicated in FIG. 2 by the shaded part of the light-metal bearing walls 2 extending into the sintered bodies 7. For saving weight, the sintered bodies 7 may be provided with the recesses 8.

Because of the infiltration of the sintered bodies 7, the shear strains occurring due to the different thermal expansion behavior of the light metal and the sintered bodies can be transferred from the light metal to the sintered bodies, which prevents relative movements from taking place between the light metal and the sintered bodies 7. Accordingly, the bearing walls 2 made of light metal adapt themselves to the thermal expansion behavior of the sintered bodies 7 at least within the area of the latter if such sintered bodies 7 are provided with adequate strength. This means, for example with a required adaptation of the thermal expansion behavior of the bearing walls 2 to the thermal expansion behavior of the fastening screws 6, that the sintered bodies 7 must have a corresponding behavior of thermal expansion in order to limit the thermal expansion behavior of the bearing walls 2.

In order to facilitate the infiltration of the sintered bodies 7 by the light metal as the bearing walls 2 are being cast, the sintered bodies 7 have to be provided with a corresponding porosity. This can be easily assured, for example by selecting the grain size of the sinter powder and its distribution accordingly, or by the space keeping means determining the later pores. Furthermore, the sintered bodies may contain alloying elements, for example nickel, which react exothermically with the light metal and thus reduce the viscosity of the melt. For securing adequate strength, the sintered bodies may be provided with a reinforcement as well, which is compressed jointly with the sinter powder and consists of, for example a wire mesh or reinforcing fibers.

The invention is, of course, not limited to the exemplified embodiment shown but may be employed whereever forces have to be introduced into a molded light-metal part via fastening screws under different thermal stresses. According to the exemplified embodiment, the sintered bodies 7 may be arranged next to the holes 5 for receiving the fastening screws 6, but also may be penetrated by the fastening screws 7. What matters here only is that the light metal area of the molded part maintained under pressure strain by the fastening screws 6 is prevented from its free thermal expansion behavior.

What is claimed is:

1. A molded part made of light metal, in particular a crankcase for an internal combustion engine, the molded part having holes for receiving fastening screws which may exert compressive strains on the molded body, comprising at least one open-pored sintered body cast in the light metal area exposed to the compressive strains, the light metal infiltrating in the pores of a surface layer of the sintered body, and the sintered body having a lower coefficient of thermal expansion than the light metal and a strength corresponding at least to the strength of the light metal when combined with the infiltrated light metal.

2. The molded part according to claim 1, wherein the sintered body has a coefficient of thermal expansion adapted to the fastening screws.

3. The molded part according to claim 1, wherein the sintered body has a higher density in a core area than in the surface layer.

4. The molded part according to claim 1, wherein the sintered body comprises a reinforcement.

* * * * *